Figure 1:
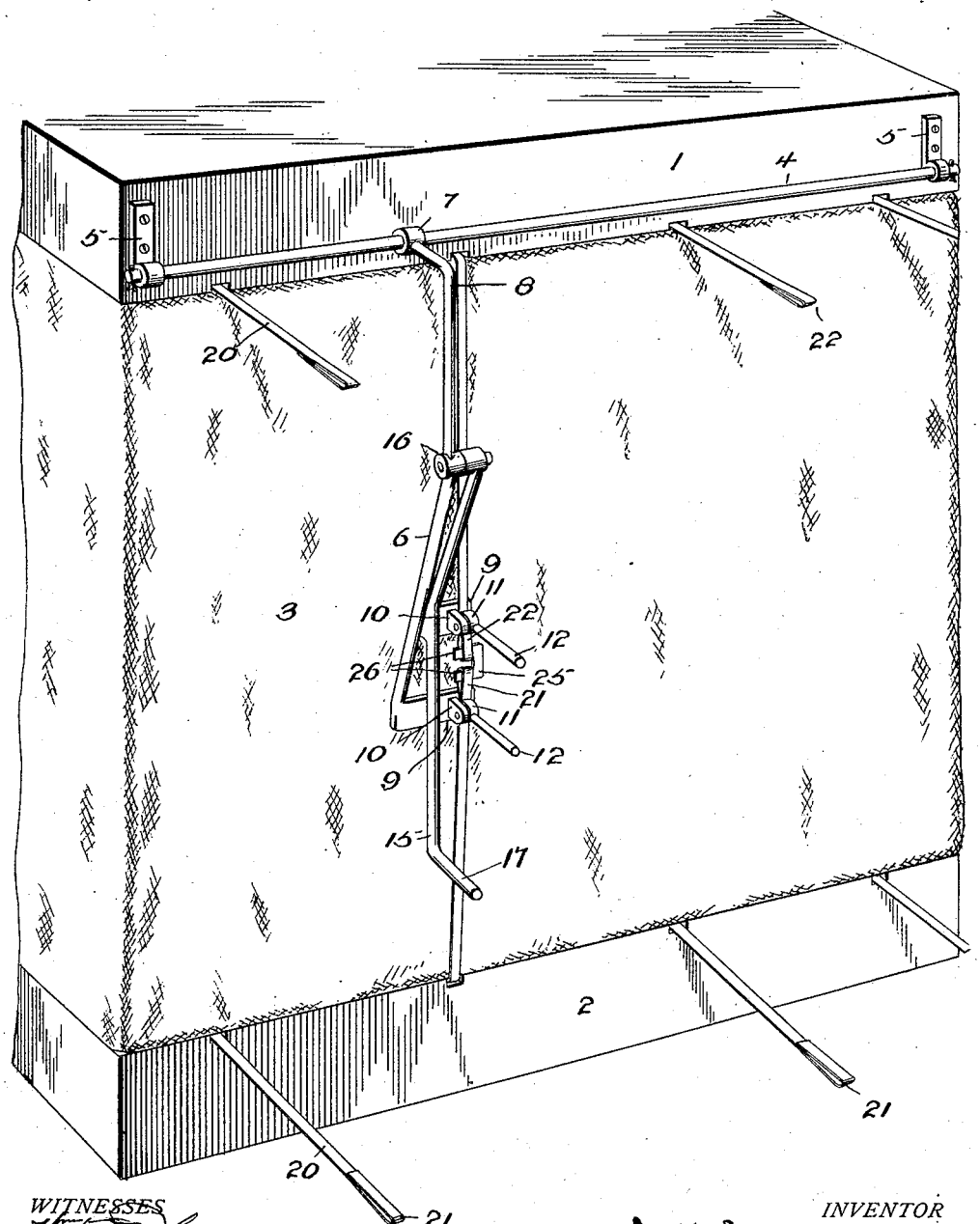

J. H. MARION.
BALE BAND APPLYING DEVICE.
APPLICATION FILED JAN. 8, 1913.

1,079,602.

Patented Nov. 25, 1913.

2 SHEETS—SHEET 1.

WITNESSES

INVENTOR
J. H. Marion.
By
Attorneys

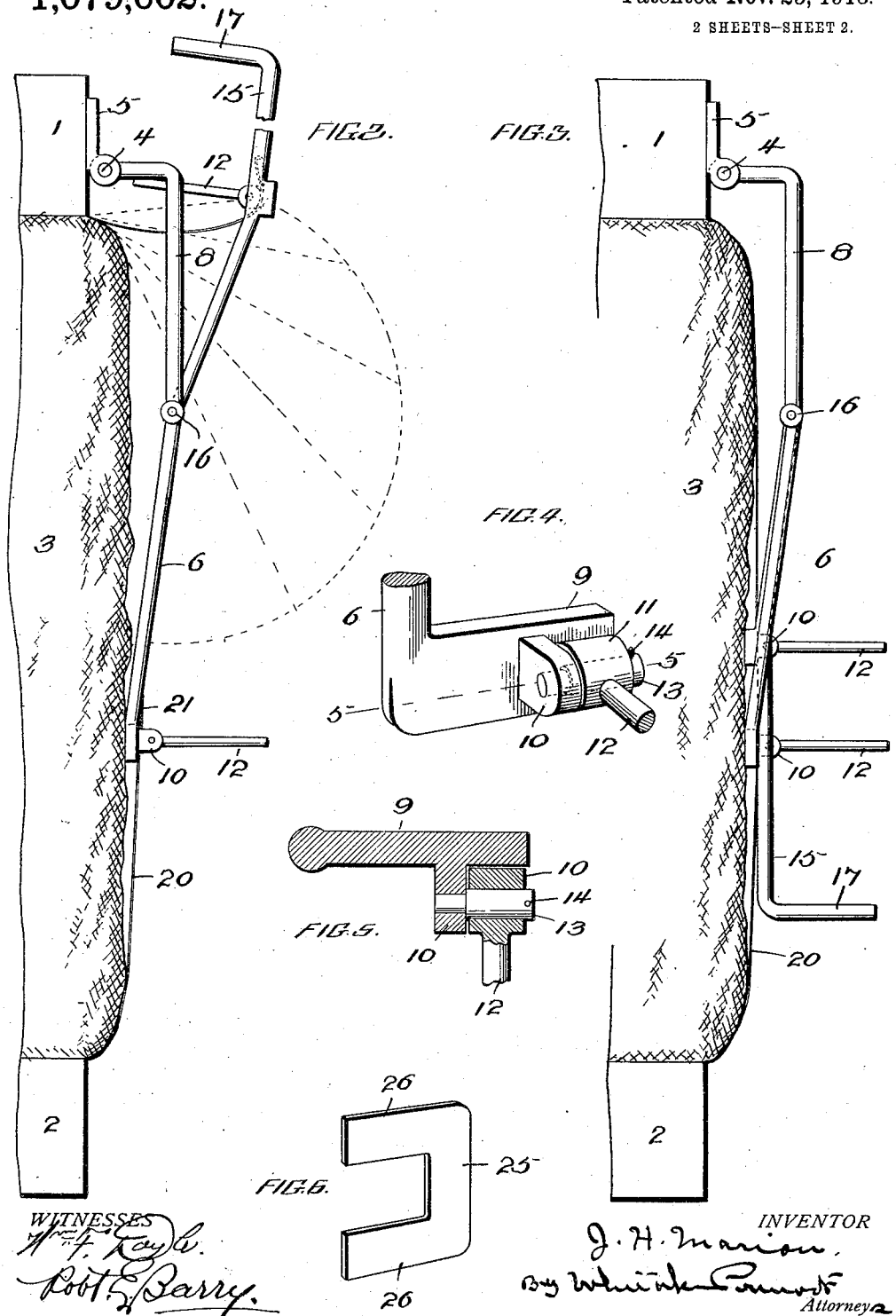

UNITED STATES PATENT OFFICE.

JOHN HARDIN MARION, OF CHESTER, SOUTH CAROLINA.

BALE-BAND-APPLYING DEVICE.

1,079,602. Specification of Letters Patent. Patented Nov. 25, 1913.

Application filed January 8, 1913. Serial No. 740,860.

*To all whom it may concern:*

Be it known that I, JOHN H. MARION, a citizen of the United States, residing at Chester, in the county of Chester and State of South Carolina, have invented certain new and useful Improvements in Bale-Band-Applying Devices; and I do hereby declare the following to be a full, clear, and exact description of the invention, such as will enable others skilled in the art to which it appertains to make and use the same.

My invention consists in the novel features hereinafter described reference being had to the accompanying drawings which show one embodiment of the invention selected by me for the purpose of illustrating the invention, and the invention is fully disclosed in the following description and claims.

Referring to the drawings, Figure 1 is a perspective view, showing a portion of a press or other device for confining the bales under pressure previously to the application of the bands or ties and showing an embodiment of my improved bale tie applying device, operatively connected therewith, the device being shown as holding a bale tie in stretched position just after the connecting device or staple has been inserted. Fig. 2 is a side elevation of the parts shown in Fig. 1, the stretching lever being shown in elevated position, and dotted lines indicating the gradual straining of the band as the lever is moved downward. Fig. 3 is a similar elevation showing the stretching lever in its lowest position. Fig. 4 is a detail perspective view of one of the clamping devices. Fig. 5 is a sectional view on line 5—5, Fig. 4. Fig. 6 is a detail view of the particular connecting device or buckle which I prefer to employ.

In order to secure bales of cotton, wool, cloth or other material, it is usual to pass metallic bands or ties around the same while they are held under compression in the press or other device, and to secure the ends of said bands or ties by hand to a connecting device or buckle. In so doing it is not possible to draw all the slack out of the bands or ties and on releasing the bales from compression they expand considerably, thus losing in density and increasing in size and undoing to a certain extent the work which has been accomplished in the compressing operation by a great expenditure of power.

For example, in baling cotton in the southern part of the United States, it is not unusual for the bales when released from the press to swell from five to ten inches. This loss of density could obviously be prevented entirely or to a very great extent by drawing the bale bands or ties perfectly taut around the bale.

The object of my invention is to provide simple and effective means for drawing the bands or ties so tightly around the bale that no material loss of density, or expansion can take place, and to hold the ends of the band in position to permit their ends to be coupled by a suitable connecting device or buckle.

My invention also contemplates a construction by means of which the apparatus for stretching the bale bands or ties, can be moved laterally away from the band after its ends are connected, and into position to secure another band in the same manner.

In carrying out my invention in its preferred form, as illustrated in the accompanying drawings, I employ a sustaining bar, which is preferably so mounted as to be movable lengthwise of the bale, and which carries a grip for holding a loop formed at one end of the bale band, a similar loop being formed at the other end of the band, and held by a grip carried by a swinging stretching lever, pivoted to the sustaining bar in such relation to the bale that in swinging said lever through its arc of movement the band will be gradually and powerfully strained or stretched until it lies tightly around the bale, and the loop carried by said lever is brought into such priximity to the other loop that a securing device or buckle can be made to engage said loops and secure the ends of the band together, thus precluding any appreciable expansion of the bale when released from the press or other compression mechanism.

In the embodiment of my invention selected for the purpose of illustrating the same and shown in the accompanying drawing, 1 represents the upper jaw and 2 the lower jaw of a press of any preferred type for compressing or holding a bale 3 under compression.

4 represents a horizontally disposed guiding and supporting bar, secured to a part of the press, and preferably to the upper jaw by any suitable means as the brackets 5, 5.

A vertically disposed sustaining bar 6 is secured to said guide bar 4, so as to be capable of sliding thereon, and also of being turned upward, or swung outward out of the way if desired, and to this end the upper end of the bar 6 is preferably provided with a sleeve or collar 7 having a sliding engagement with the guide bar 4. The bar 6 is also preferably provided with an offset portion 8 at its upper end extending away from the bale to accommodate the bale, in case it bulges laterally beyond the edge of the upper jaw.

The sustaining bar extends downward to a point near the lower part of the bale where it is provided with any suitable form of band grip or clamp for firmly holding one end of a bale band or tie. In the drawings I have shown a form of grip which I prefer to employ but I do not limit myself to a grip of this particular construction. As shown the grip comprises a flat gripping plate 9 preferably formed integrally with the bar 6 and carrying a boss 10, to which is pivoted an eccentric or cam 11 having a lever or handle 12 by which it can be rotated so as to grip the band between it and the plate 9. In practice the boss 10 is conveniently provided with a pintle 13, upon which the cam or eccentric 11 is revolubly mounted (see Figs. 4 and 5) and a cotter 14 passing through an aperture in the end of the pintle prevents the cam from becoming disengaged from the pintle.

15 represents the stretching lever, which is pivoted to the sustaining bar 6, at 16 in any desired manner, preferably at a point below the upper edge of the bale, and said lever is provided with a band grip or clamp intermediate its ends, and at such distance from its pivotal connection that when the lever is in its lower position as shown in Figs. 1 and 3, the grip will be a short distance from and above the grip on the sustaining bar. The grip on the stretching lever may also be of any preferred form but as here shown, is made similarly to that previously described, and the corresponding parts are designated by similar reference numerals. The free end of the lever 15 is preferably provided with a handle 17, here shown as an outwardly projecting portion, at its extreme end, to facilitate the operation of the lever. The length of the stretching lever, and the location of its pivotal connection with the sustaining bar are such that the lever when swung upward to a nearly vertical position will bring its band grip considerably nearer the upper edge of the bale than it is when the lever is in its lowered position, and as the lever is swung downward its grip will be moved gradually farther from the upper edge of the bale, as indicated by dotted lines in Fig. 2.

The bale 3 being under compression between the jaws 1 and 2, which may be the jaws of a baling press in which the bale is formed, or of a suitable press for holding a bale in compressed condition after its formation, the bale ties 20 which are ordinarily flat strips of metal, are passed around the bale, in the usual manner, by passing them through recesses formed in the opposed jaws. The sustaining bar 6 is then moved on the guide bar 4 until the grips are in alinement with one of the bale bands, the lower end of the band is then bent back upon itself to form a loop 21 which is placed between the plate 9 and cam 11 of the grip on the sustaining bar, and clamped firmly by rotating the cam. The stretching lever is then swung upwardly as indicated in Fig. 2, and the other end of the bale band is bent back upon itself to form a loop 22 and similarly clamped in the grip carried by said lever. The loops 21 and 22 are allowed to project such a distance from their respective grips that when the lever is drawn down they will be brought within a predetermined distance of each other, and the length of the band between the loops will be such as to confine the bale firmly when the ends of the band are secured together. The lever 15 is now forced downward thus drawing the band tightly around the bale, taking out all the slack, and stretching it taut, until the lever strikes the plate 9 of the lower grip. The ends of the band are then secured together in any suitable manner. I prefer to secure them together by means of a connecting device or buckle 25, shown in Fig. 1 and in detail in Fig. 6, which comprises a flat piece of metal of U-shape, the arms 26, 26 of which are made to engage the loops 21, 22, as shown in Fig. 1. These buckles may be punched from wrought sheet metal, or formed in any other desired manner, and will hold the band firmly without permitting any appreciable loss of density when the bale is released from the jaws 1 and 2. As soon as one band is secured the cams 9 of the grips are rotated so as to release their hold on the band, and the sustaining bar is moved away from the band, by sliding it along the guide bar 4 and into position to secure another band, and the operation is repeated until the bands are all secured. As the axis of the pivotal connection of lever 15 is outside of the line of the bale band when the lever is in its lower position as in Fig. 2, the lever is locked in contact with the plate 9 of the sustaining bar, by the pull of the band, and the portion of said plate engaged by the lever forms a stop to limit the further upward movement of the lever toward the bale. The lever will, therefore, remain in the position shown in Figs. 1 and 3, while the buckle is placed in position.

When the bands have all been secured in the manner described, the bale may be removed from between the jaws 1, 2 and will be firmly held by the bands thus preventing swelling of the bale and consequent loss of density. When not in use the sustaining bar may be moved to one end of the guide bar and permitted to hang therefrom or it may be swung up out of the way and secured in any desired manner, the sustaining bar being pivotally mounted on the guide bar, by means of the sleeve 7.

What I claim and desire to secure by Letters Patent is:—

1. In a device for applying bale bands the combination with a sustaining bar provided with a gripping device for engaging one end of the bale band, of a stretching lever pivoted to said bar, and carrying a gripping device for holding the other end of the bar, and located so as to be capable of swinging outwardly from the bale from a position remote from the gripping device on the sustaining bar, to a position in close proximity thereto, and means for swinging said stretching lever from one of said positions to the other to draw the band taut.

2. In a device for applying bale bands, the combination with a vertically disposed sustaining bar, provided with a gripping device for holding the lower end of the bale band, of a stretching lever pivoted to said bar at a point between said gripping device and the upper end of the bale, and provided with a gripping device for holding the upper end of the band, said lever being arranged so as to gradually stretch the band and bring its upper end into close proximity to the lower end, as the gripping device of said lever is swung from an elevated position to a substantially vertical position below the point of pivoting of said lever.

3. In a device for applying bale bands, the combination with a vertically disposed sustaining bar, means for supporting the same adjacent to the bale confining devices, and a gripping device for one end of the band carried by said bar, of a lever pivoted to said bar and provided with a gripping device, for the other end of the band, adapted to be brought into proximity to the gripping device on the sustaining bar, and a stop on said sustaining bar for arresting the movement of the said lever when in final position.

4. In a device for applying bale bands, the combination with a horizontally disposed guiding and supporting bar, of a vertically disposed sustaining bar having a sliding engagement therewith, a gripping device carried by said bar, a stretching lever pivoted to the sustaining bar, and a gripping device carried by said stretching lever.

5. In a device for applying bale bands the combination with a sustaining bar, provided with a gripping device for engaging one end of the bale band, of a stretching lever, pivoted to said sustaining bar and provided with a gripping device for the other end of the band, located between the pivotal connection of said lever with the sustaining bar, and the outer hand engaging end of the lever, whereby said lever can be swung outwardly with respect to the bale, to move its gripping device from a position remote from the gripping device on the sustaining bar into a position in close proximity thereto.

6. In a device for applying bale bands the combination with a sustaining bar means for supporting it in a position adjacent to and transversely of one face of the bale, and a gripping device for one end of the bale located adjacent to the end of said sustaining bar farther from the said supporting means, of a stretching lever pivoted to the sustaining bar between said gripping device and the said supporting means, and carrying a gripping device for the other end of the band located between the pivotal connection of said lever with the sustaining bar, and the outer hand engaging end of said lever, said lever being adapted to swing outward with respect to the adjacent face of the bale to move the gripping device carried thereby from a position remote from the gripping device on the sustaining bar, to a position in close proximity thereto.

In testimony whereof I affix my signature, in the presence of two witnesses.

JOHN HARDIN MARION.

Witnesses:
J. M. OATES,
M. L. MARION.

Copies of this patent may be obtained for five cents each, by addressing the "Commissioner of Patents, Washington, D. C."